(12) United States Patent
Leroy et al.

(10) Patent No.: US 12,266,932 B1
(45) Date of Patent: Apr. 1, 2025

(54) MODELING INVERTER OUTPUTS FOR PV SYSTEMS

(71) Applicant: BrightNight, LLC, West Palm Beach, FL (US)

(72) Inventors: Cédric Leroy, Austin, TX (US); Benjamin Calvin Bourne, Davis, CA (US)

(73) Assignee: BRIGHTNIGHT, LLC, West Palm Beach, FL (US)

( * ) Notice: Subject to any disclaimer, the term of this patent is extended or adjusted under 35 U.S.C. 154(b) by 0 days.

(21) Appl. No.: 18/915,291

(22) Filed: Oct. 14, 2024

(51) Int. Cl.
*H02J 3/00* (2006.01)
*H02J 3/38* (2006.01)

(52) U.S. Cl.
CPC ............. *H02J 3/004* (2020.01); *H02J 3/381* (2013.01); *H02J 2203/20* (2020.01); *H02J 2300/24* (2020.01)

(58) Field of Classification Search
CPC ........ H02J 3/004; H02J 3/381; H02J 2203/20; H02J 2300/24
See application file for complete search history.

(56) References Cited

U.S. PATENT DOCUMENTS

| | | | |
|---|---|---|---|
| 2021/0124089 A1* | 4/2021 | Sarwat | G06N 3/04 |
| 2021/0194424 A1* | 6/2021 | Gao | H02J 3/004 |
| 2022/0131382 A1* | 4/2022 | Mousavi | H02J 13/00002 |

* cited by examiner

*Primary Examiner* — Charles Cai
(74) *Attorney, Agent, or Firm* — Foley & Lardner LLP

(57) ABSTRACT

A method may include receiving equipment parameters of the PV power plant including PV parameters of one or more PV arrays and inverter parameters of one or more inverters, and generating a prediction of the output of the PV power plant by generating a prediction of an output of the one or more PV arrays based on the PV parameters and environmental factors including solar irradiance and weather, selecting a first inverter response curve from a first set of inverter response curves and a second inverter response curve from a second set of inverter response curves, and generating, using the first inverter response curve, the second inverter response curve, the one or more of the environmental factors, and the prediction of the output of the one or more PV arrays, a prediction of the output of the one or more inverters.

18 Claims, 9 Drawing Sheets

800

810 — Receive equipment parameters of a PV power plant including PV parameters of one or more PV arrays and inverter parameters of one or more inverters 820 — Generate a prediction of an output of the one or more PV arrays based on the PV parameters and environmental factors including solar irradiance and weather 830 — Select, based on the inverter parameters, the prediction of the output of the one or more PV arrays, and one or more of the environmental factors, a first inverter response curve from a first set of inverter response curves and a second inverter response curve from a second set of inverter response curves 840 — Generate, using the first inverter response curve, the second inverter response curve, the one or more of the environmental factors, and the prediction of the output of the one or more PV arrays, a prediction of the output of the one or more inverters

MODELING INVERTER OUTPUTS FOR PV SYSTEMS

BACKGROUND

Photovoltaic (PV) systems may be simulated or modeled to predict an output. Inaccurate predictions of output (e.g., power, energy) may result in badly designed PV systems and an imbalance between PV systems and other electrical components, such as inverters.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION

Figure 1A:
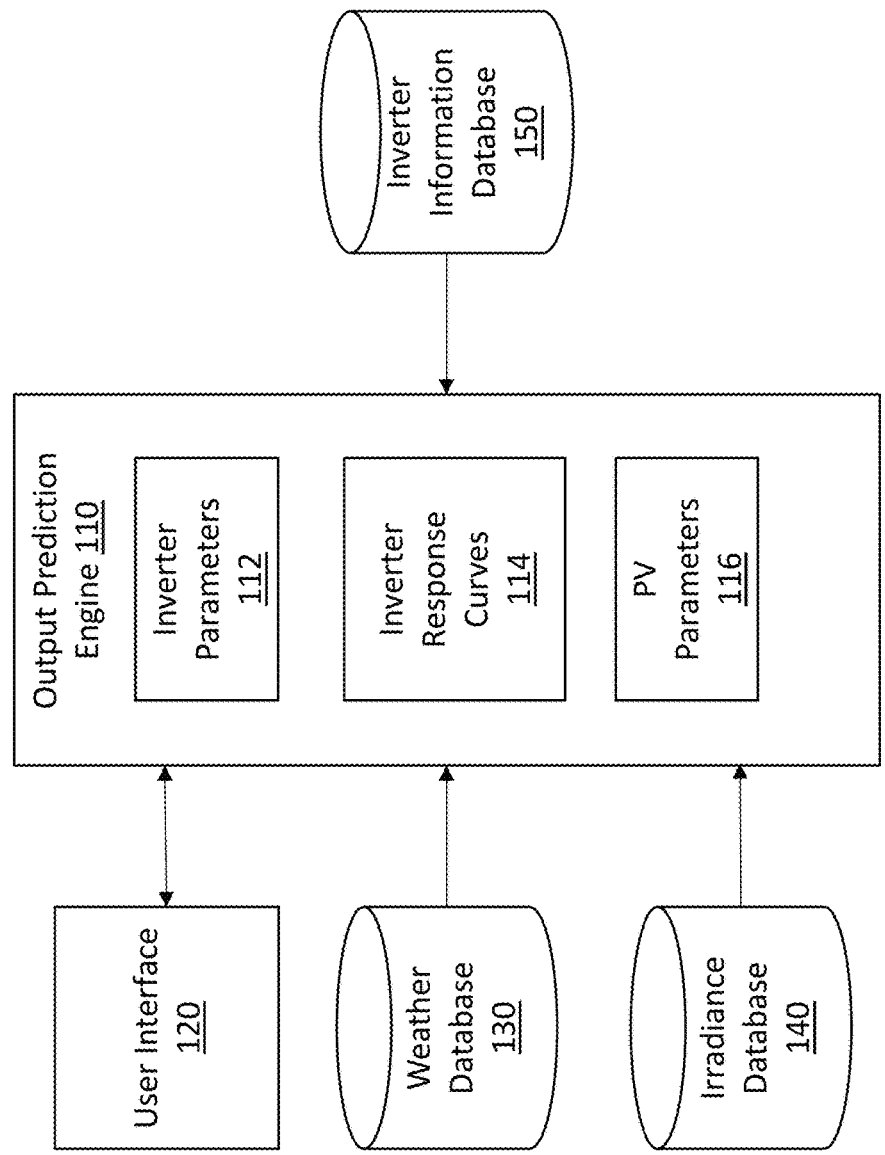
FIG. 1A is a block diagram of an example computing system for generating output predictions for PV systems.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Predictions of PV system output are used to design PV systems (e.g., PV power plants), maintain PV systems, control PV systems, and ramp up power output from other systems, among other uses. Accurate output predictions serve to reduce degradation of system components, increase an effective output of PV systems, and more efficiently control power production. Implementations and examples described herein address technical challenges of accurately designing and predicting power plant output to reduce operational risks and improve efficiencies, thereby lowering operational costs. For example, reducing ramp-up rates of various power-generation and power-storage components based on accurate output predictions can reduce degradation and prolong component lifetime. In another example, accurate output predictions (e.g., 24-hour, 48-hour forecasts) can be used to more efficiently use available power-generation resources by maximizing use of resources that have near-zero marginal costs, such as PV arrays. In another example, accurate output predictions can be used to design PV systems to be properly sized to avoid curtailment of power due to limitations such as point-of-interconnect limit. Embodiments and examples discussed herein provide for generating accurate output predictions by combining multiple response parameters of components (e.g., inverters) based on environmental conditions. In this way, the output predictions can accurately reflect how the components would respond to environmental conditions. By selecting response curves based on environmental conditions and calculating response parameters by applying the environmental conditions and predicted component interactions to the response curves, output predictions closely correlate with real-world PV outputs across a wide variety of environmental conditions. Implementations and examples described herein address technical challenges of accurately generating long-term predictions of output.

Over the lifetime of a PV system, slight differences in output predictions in response to various environmental conditions can result in dramatic differences in degradation, control efficiency, output yield, and accuracy. Furthermore, increased component degradation caused by sub-optimal control due to inaccurate predictions and can further reduce an accuracy of ongoing output predictions. The embodiments and examples discussed herein address these technical problems to provide accurate output predictions for PV systems under various environmental conditions, allowing for long-term accuracy.

FIG. 1A is a block diagram of an example computing system 100 for generating output predictions for PV systems, otherwise referred to PV power plants. The PV systems can include PV arrays, inverters, and/or energy storage devices. The computing system 100 includes an output prediction engine 110. The output prediction engine 110 generates output predictions for PV systems. The output prediction engine 110 may include one or more non-transitory, computer-readable media including instructions which, when executed by one or more processors, cause the one or more processors to generate output predictions for PV systems. In some implementations, the output prediction engine 110 includes the one or more processors. In some implementations, the output prediction engine 110 is implemented as via execution of instructions by one or more processors.

The output prediction engine 110 includes inverter parameters 112, inverter response curves 114, and PV parameters 116. While various aspects of the output prediction engine 110 are described relative to inverters, inverter response curves, and inverter parameters, similar principles can apply to other PV system components, such as PV arrays.

The inverter parameters 112 indicate parameters for inverters of a PV system to be simulated (e.g., for which output predictions are to be generated). The inverter parameters 112 can include parameters such as inverter model number, inverter model number, inverter UUID, manufacturer, power factor, nominal AC power, maximum AC power, power limits at different temperatures, and other parameters. In some implementations, the inverter parameters 112 are received via a user interface 120. In an example, a user indicates, via the user interface 120, the inverter parameters 112 for a specific type of inverter. In some implementations, the inverter parameters are received from an inverter information database 150. In an example, a user indicates an inverter model name via the user interface 120 and the output prediction engine 110 retrieves the inverter parameters 112 from the inverter information database 150 based on the indicated inverter.

The inverter response curves 114 indicate inverter responses for different environmental conditions and component interactions. In an example, the inverter response curves 114 include a set of response curves for different inverter temperatures indicating inverter capacity derating versus voltage at the different temperatures. In an example, the inverter response curves 114 include a set of response curves for different elevations indicating inverter capacity derating versus temperature at the different elevations. In an example, the inverter response curves 114 include a set of response curves for different voltages indicating inverter efficiency versus output power at the different voltages. The inverter response curves 114 may include multiple sets of response curves corresponding to different environmental conditions (e.g., temperature, wind speed, humidity, elevation, etc.) and different component interactions (e.g., PV array output, impedance, resistance, etc.). Each response curve may include two or more measurements between which values can be interpolated. The two or more measurements can be obtained via the user interface 120 and/or from the inverter information database 150. In an example, the two or more measurements are obtained from manufacturer data. In some implementations, the two or more measurements and/or the inverter response curves 114 are calculated based on the inverter parameters 112.

Figure 2:
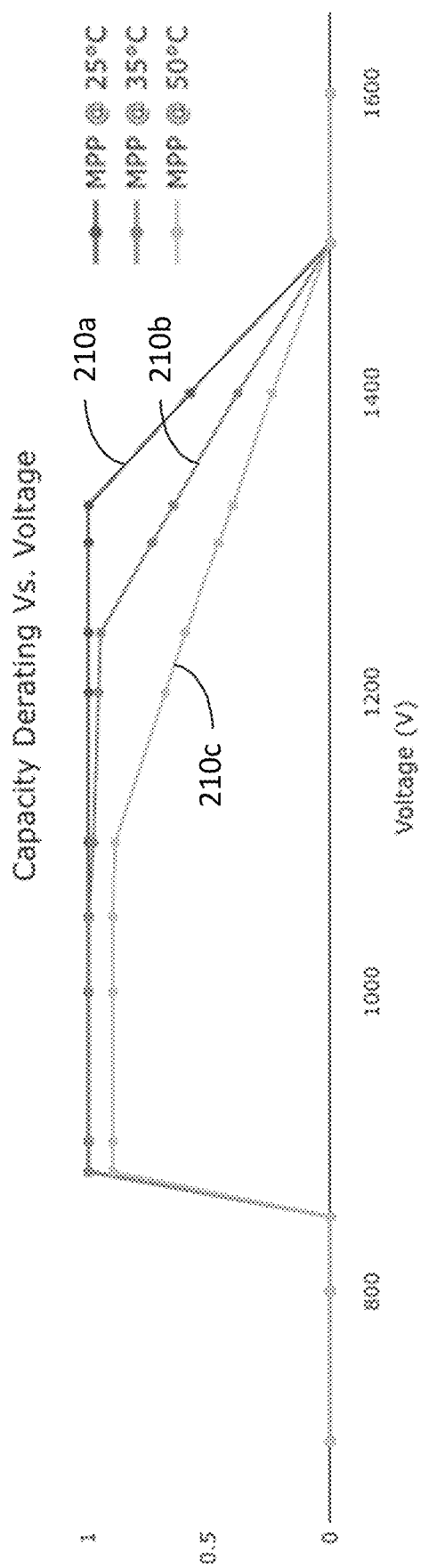
FIG. 2 illustrates example inverter response curves for capacity derating versus voltage and ambient temperature.
Figure 3:
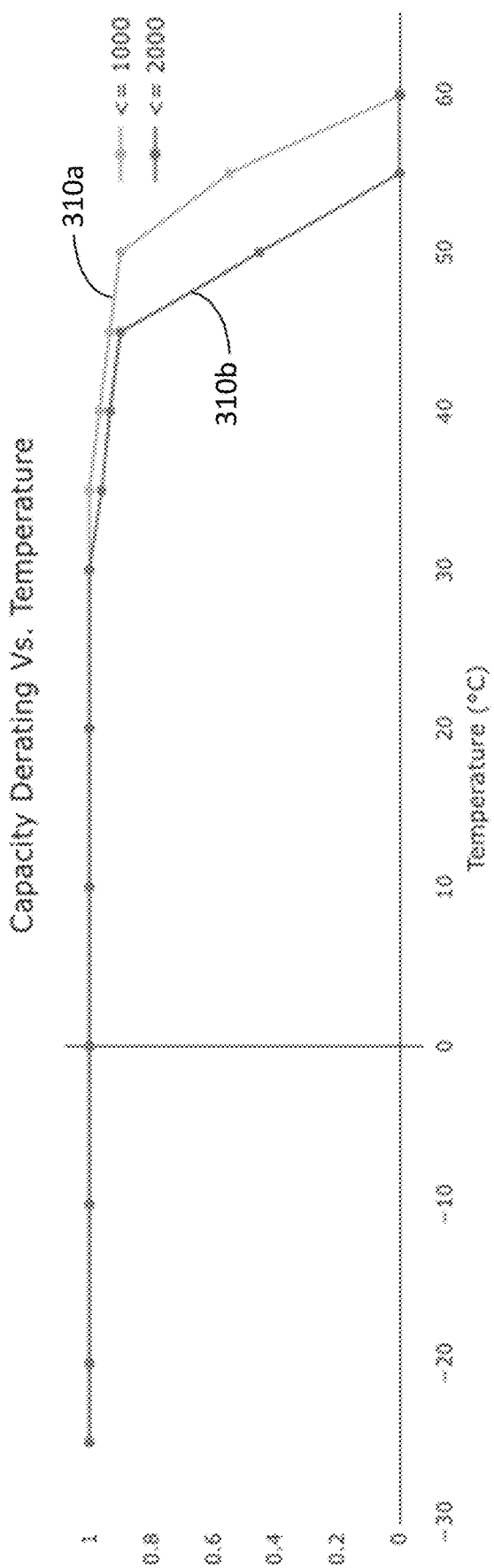
FIG. 3 illustrates example inverter response curves for capacity derating versus ambient temperature and elevation of the installation site.

The inverter response curves 114 may be generated using interpolated data from the inverter parameters 112. In some implementations, the inverter response curves 114 are generated using two-dimensional interpolation by parts. In an example, the inverter response curves 114 can include a first set of derate curves that give a first derate factor as a function of voltage and temperature and a second set of derate curves that give a second derate factor as a function of temperature and elevation. An example of the first set of derate curves is shown in FIG. 2 and an example of the second set of derate curves is shown in FIG. 3.

The PV parameters 116 indicate parameters for PV arrays of the PV system to be simulated. The PV parameters 116 can include parameters such as PV array model number, number of PV arrays, string length, nominal efficiency, maximum DC power, power limits at different temperatures, and other parameters. The PV parameters 116 can be received via the user interface 120 and/or another source, such as a PV information database. In an example, a user indicates, via the user interface 120, the PV parameters 116 for a specific type of PV array. In an example, a user indicates, via the user interface 120, a type of PV array and the output prediction engine 110 retrieves from memory the PV parameters 116 for the type of PV array and/or retrieves the PV parameters 116 for the type of PV array from another source.

In some implementations, the output prediction engine 110 includes PV response curves that indicate PV array responses to various environmental conditions and/or component interactions, similar to the inverter response curves 114.

The output prediction engine 110 receives weather data from a weather database 130 and irradiance data from an irradiance database 140 to determine the environmental factors and component interactions to be applied to the inverter response curves 114. In some implementations, the weather database 130 and the irradiance database 140 are the same database. In an example, the weather database 130 includes the irradiance database 140, or includes the irradiance data. In an example, the weather data indicates a temperature, wind speed, and humidity for a calendar day and the irradiance data indicates a solar irradiance on PV arrays of the PV system for the calendar day. In this example, the output prediction engine 110 determines a PV array output for the PV arrays of the PV system based on the weather data and the irradiance data and applies the weather data and the PV array output to the inverter response curves 114 to determine an output of the inverters of the PV system to determine an output of the PV system. In this way, the output of the PV system is determined based on responses of the PV arrays and the PV inverters to the weather data and the irradiance data, resulting in an output prediction that closely correlates with an actual output. In an example, the weather data indicates a temperature, wind speed, and humidity for an hour and the irradiance data indicates a solar irradiance on PV arrays of the PV system for the hour. In this example, the output prediction engine 110 determines a PV array output for the PV arrays of the PV system based on the weather data and the irradiance data and applies the weather data and the PV array output to the inverter response curves 114 to determine an output of the inverters of the PV system to determine an output of the PV system. The output prediction engine 110 can generate output predictions of the PV system at any time granularity such as one minute, five minute, ten minutes, fifteen minutes, thirty minutes, and sixty minutes.

In some implementations, the weather database 130 and/or the irradiance database 140 include weather data and/or irradiance data, respectively, in fifteen-minute increments, such that the output prediction for the PV system generated by the output prediction engine 110 can be generated in fifteen-minute increments, providing for granular predictions of PV system output. The weather data and/or the solar irradiance data can be based on a variety of measurements, such as satellite images, radar measurements, wind measurements, humidity measurements, temperature measurements, irradiance measurements, and other measurements.

In some implementations, the weather database 130 and the irradiance database 140 include forecasts of the weather data and irradiance data, respectively. The output prediction engine 110 can use the forecasts of the weather data and irradiance data to generate the output prediction. In an example, the forecasts of the weather data and irradiance data are for a subsequent calendar day, allowing the output prediction engine 110 to generate an output prediction for the subsequent calendar day. In an example, the forecasts of the weather data and irradiance data are for a subsequent hour, allowing the output prediction engine 110 to generate an output prediction for the subsequent hour. In an example, the forecasts of the weather data and irradiance data include forecasts for a range of future times and are updated every fifteen minutes, allowing the output prediction engine 110 to generate output predictions for the range of future times, updating the output predictions every fifteen minutes.

The output prediction engine 110 can provide the output prediction, or output predictions, to the user interface 120 for display. In some implementations, the output prediction engine 110 provides the output prediction to a PV system controller to control one or more parameters of the PV system. In an example, the output prediction engine 110 provides the output prediction to the PV system controller which modifies inverter parameters and/or energy storage system parameters based on the output prediction to improve an efficiency of the PV system or to reduce a degradation of the components of the PV system. The PV controller may be implemented as a combination of hardware and software to provide the functionality described herein (i.e., controlling one or more parameters of the PV system).

Figure 1B:
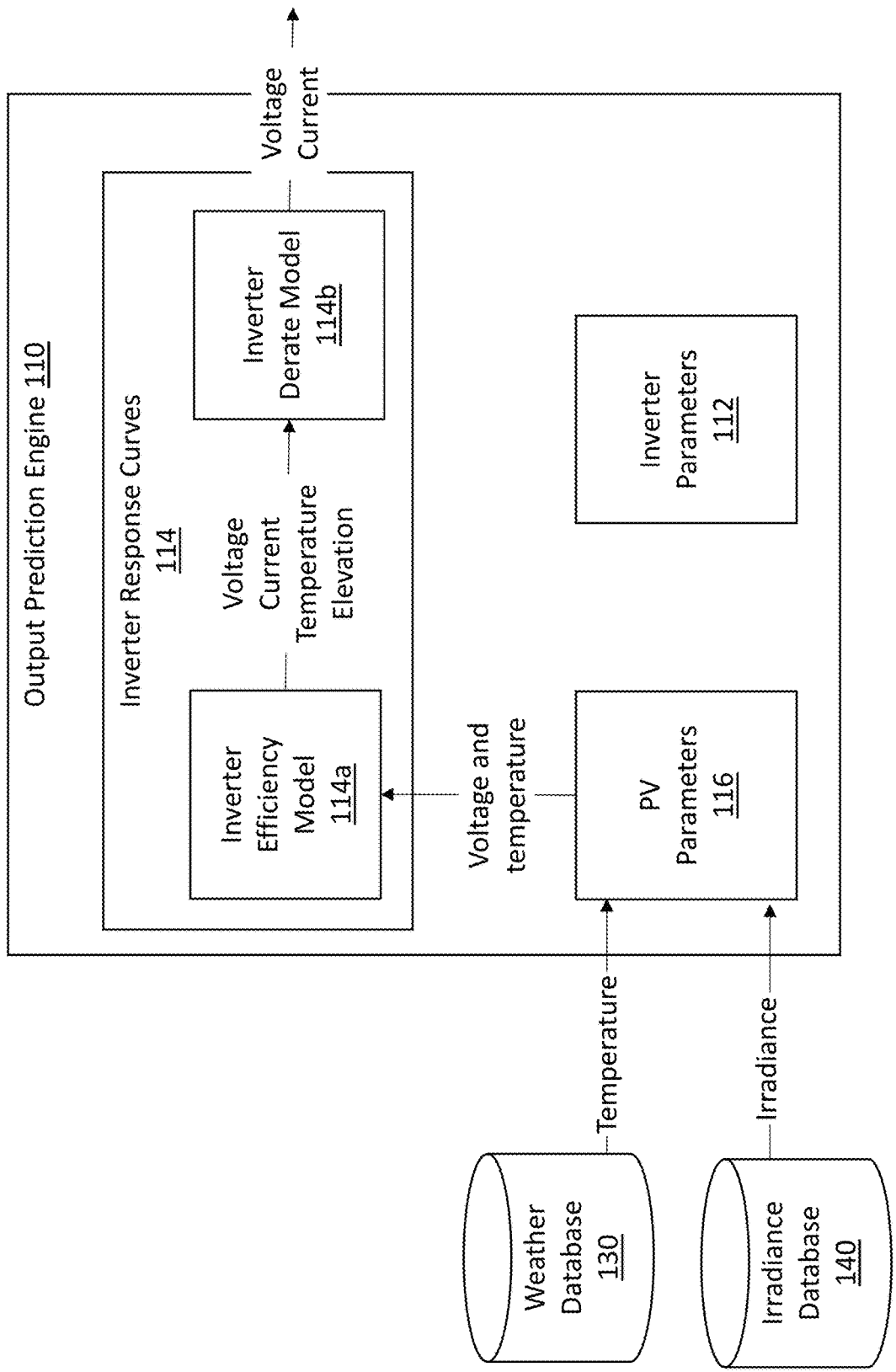
FIG. 1B is a flow diagram showing an example of how the system of FIG. 1A applies the inverter response curves.

FIG. 1B is a flow diagram showing an example of how the system 100 of FIG. 1A applies the inverter response curves 114. As illustrated in FIG. 1B, the inverter response curves 114 can include an inverter efficiency model 114a and an inverter derate model 114b. In some implementations, the inverter derate model 114b includes two derate models: a first derate model that determines a first derate factor based on voltage and temperature, and a second derate model that determines a second derate factor based on temperature and elevation. The two derate factors may be added together to determine an overall all derate factor.

The weather database 130 and the irradiance database 140 provide temperature data and irradiance data, respectively, to the output prediction engine 110. As discussed herein, the weather database 130 and the irradiance database 140 may be a single database. The temperature data and the irradiance data may be time series data. In an example, the temperature data and the irradiance data are included in a single file including time data correlated with the temperature data and the irradiance data. The PV parameters 116 are used, with the temperature data and the irradiance data, to determine voltage data. In an example, an efficiency of the PV arrays at different temperatures is used to determine an output voltage of the PV arrays based on the amount of irradiance received by the PV arrays. The voltage data and the temperature data are provided to the inverter response curves 114. The voltage data and the temperature data may be time series data, similar to the temperature data and the irradiance data. The temperature data may be the same as the temperature data provided by the weather database 130.

Figure 4:
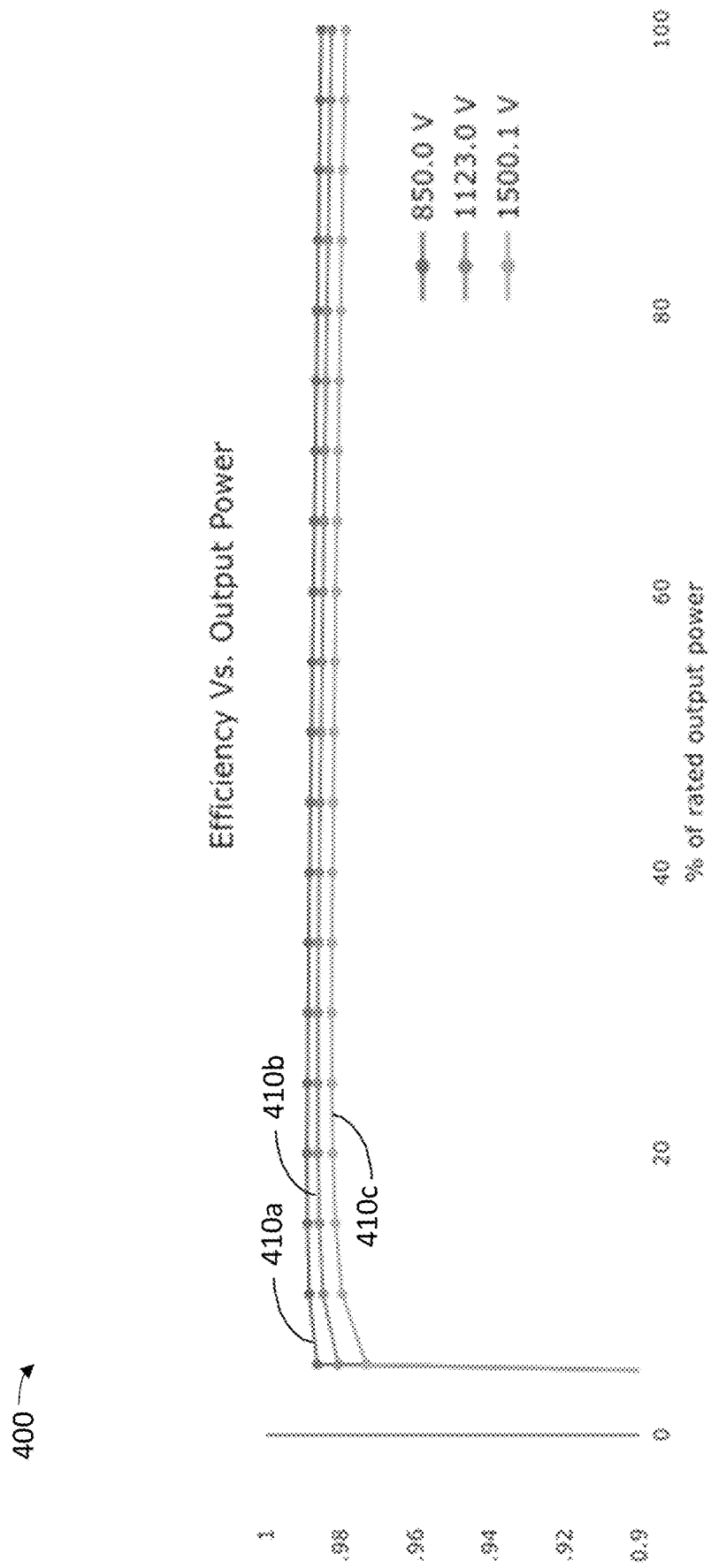
FIG. 4 illustrates example inverter response curves for efficiency versus output power and voltage.

The inverter efficiency model 114a may use the voltage and temperature data to determine an efficiency of the inverters and apply the determined efficiency to determine an output voltage and output current for the inverters. An example of a set of efficiency curves used by the inverter efficiency model 114a is illustrated in FIG. 4. The inverter efficiency model 114a provides the output voltage and the output current for the inverters as well as the temperature data to the inverter derate model 114b. The output voltage, the output current, and the temperature data may be time series data. The temperature data may be same temperature data provided by the weather database 130. In an example, the inverter efficiency model 114a provides a data structure to the inverter derate model 114b that includes the temperature data correlated with output voltages and output currents of the inverters at different times.

The inverter derate model 114b determines one or more derate factors based on the output of the inverter efficiency model 114a. The one or more derate factors are used to modify the output of the inverter efficiency model 114a. The output voltage and output current (e.g., output power) of the inverters may be multiplied by the one or more derate factors to modify the output voltage and output current to accurately reflect derating of the inverters due to voltage, temperature, and/or elevation. As discussed herein, the one or more derate factors can include a first derate factor calculated as a function of voltage and temperature, and a second derate factor calculated as a function of temperature and elevation. In an example, the first and second derate factors are applied sequentially, such that the output voltage is modified based on the second derate factor calculated as a function of temperature and elevation, and then the modified output voltage is used to determine the first derate factor calculated as a function of voltage and temperature. The inverter derate model 114b outputs a modified output voltage and a modified output current (i.e., modified using the one or more derate factors) for the inverters. The modified output voltage and the modified output current may be time series data giving inverter output for the times in the temperature data and the irradiance data.

FIG. 2 illustrates example inverter response curves 210 for capacity derating versus voltage. The inverter response curves 210 can be included in the inverter response curves 114 of FIG. 1A. In an example, the inverter response curves 210 represent a set of inverter response curves indicating capacity derating versus voltage at different ambient temperatures among multiple sets of inverter response curves of the inverter response curves 114 of FIG. 1A (e.g., sets of inverter response curves for voltage derate, elevation derate, etc.). The inverter response curves 210 may be based on an expected inverter response to inverter operating temperature at the reported ambient temperature. The inverter response curves 210 include a first inverter response curve 210a, a second inverter response curve 210b, and a third inverter response curve 210c. The first inverter response curve 210a indicates a capacity derating of an inverter at voltages from zero volts to fifteen hundred volts when the inverter is at twenty-five degrees Celsius. The second inverter response curve 210b indicates the capacity derating of the inverter at voltages from zero volts to fifteen hundred volts when the inverter is at thirty-five degrees Celsius. The third inverter response curve 210c indicates the capacity derating of the inverter at voltages from zero volts to fifteen hundred volts when the inverter is at fifty degrees Celsius. Each of the inverter response curves 210 includes different measured capacity deratings at multiple voltages, where inverter capacity derating at other voltages can be predicted by interpolating between the measured capacity deratings. In this way, the inverter response curves can be generated based on the measured capacity deratings to provide inverter output predictions at arbitrary voltages.

As illustrated, the inverter response curves 210 indicate different inverter capacity deratings at the same voltages. For example, the first inverter response curve 210a, corresponding to an inverter temperature of twenty-five degrees Celsius, indicates a capacity of nearly one (i.e., capacity derating of nearly zero) at twelve hundred volts, while the third inverter response curve 210c, corresponding to an inverter temperature of fifty degrees Celsius, indicates a capacity of approximately 0.6 (i.e., capacity derating of approximately 0.4) at twelve hundred volts. In generating an output prediction, either the first inverter response curve 210a, the second inverter response curve 210b, or the third inverter response curve 210c is selected, based on the ambient temperature, to determine the capacity derating of PV system inverters based on a predicted PV output (voltage). As shown in FIG. 2, differences between the capacity derating at the same voltage indicated by the inverter response curves 210 can differ dramatically, reflecting an increased accuracy of the output prediction when selecting a set of response curves from the inverter response curves 210, as provided by the inverter manufacturer.

While the inverter response curves 210 are illustrated as including three response curves for different temperatures, the inverter response curves 210 can include any number of response curves for different temperatures. In some implementations, additional response curves can be generated by interpolating between the inverter response curves 210 that are generated based on measured values. In some implementations, weights are applied to values generated using two response curves of the inverter response curves 210 based on proximity to the two response curves. In an example, a first weight of 50% is applied to a capacity derating value generated using the first inverter response curve 210a and a second weight of 50% is applied to a capacity derating value generated using the second inverter response curve 210b based on the inverter temperature being thirty degrees Celsius, or halfway between the temperatures associated with the first inverter response curve 210a and the second inverter response curve 210b.

FIG. 3 illustrates example inverter response curves 310 for capacity derating versus temperature. The inverter response curves 310 can be included in the inverter response curves 114 of FIG. 1A. In an example, the inverter response curves 310 represent a set of inverter response curves indicating capacity derating versus temperature at different elevations among multiple sets of inverter response curves of the inverter response curves 114 of FIG. 1A. The different elevations are inverter elevations, which may correspond to PV system elevation. The inverter response curves 310 include a first inverter response curve 310a and a second inverter response curve 310b. The first inverter response curve 310a indicates a capacity derating of an inverter at temperatures from negative thirty Celsius to sixty Celsius when the inverter is at one thousand meters elevation. The second inverter response curve 310b indicates the capacity derating of an inverter at temperatures from negative thirty Celsius to sixty Celsius when the inverter is at two thousand meters elevation. Each of the inverter response curves includes different measured capacity deratings at multiple temperatures, where inverter capacity derating at other temperatures can be predicted by interpolating between the measured capacity deratings. In this way, the inverter response curves can be generated based on the measured capacity deratings to provide inverter output predictions at arbitrary temperatures.

As illustrated, the inverter response curves 310 indicate different inverter capacity deratings at the same temperatures. For example, the first inverter response curve 310a, corresponding to an inverter elevation of one thousand meters, indicates a capacity of about 0.9 (i.e., capacity derating of about 0.1) at fifty degrees Celsius, while the second inverter response curve 310b, corresponding to an inverter elevation of two thousand meters, indicates a capacity of about 0.5 (i.e., capacity derating of about 0.5) at fifty degrees Celsius. In generating an output prediction, either the first inverter response curve 310a or the second inverter response curve 310b is selected, based on the inverter elevation, to determine the capacity derating of PV system inverters based on a predicted ambient temperature (e.g., as indicated in weather data). As shown in FIG. 3, differences between the capacity derating at the same temperature indicated by the inverter response curves 310 can differ dramatically, reflecting an increased accuracy of the output prediction when selecting a response curve from the inverter response curves 310.

While the inverter response curves 310 are illustrated as including two response curves for different elevations, the inverter response curves 310 can include any number of response curves for different elevations. In some implementations, additional response curves can be generated by interpolating between the inverter response curves 310 that are generated based on measured values. In some implementations, weights are applied to values generated using two response curves of the inverter response curves 310 based on proximity to the two response curves. In an example, a first weight of 50% is applied to a capacity derating value generated using the first inverter response curve 310a and a second weight of 50% is applied to a capacity derating value generated using the second inverter response curve 310b based on the inverter elevation being fifteen hundred meters, or halfway between the elevations associated with the first inverter response curve 310a and the second inverter response curve 310b. In some implementations, derating values for elevations above two thousand meters are extrapolated based on the inverter response curves 310. In an example, a third inverter response curve is generated by extrapolating from the first inverter response curve 310a and the second inverter response curve 310b.

FIG. 4 illustrates example inverter response curves 410 for efficiency versus output power. The inverter response curves 410 can be included in the inverter response curves 112 of FIG. 1A. In an example, the inverter response curves 410 represent a set of inverter response curves indicating inverter efficiency as a function of output power at different output voltage levels among multiple sets of inverter response curves of the inverter response curves 112 of FIG. 1A. The different percentages of output power may be based on a nominal output power, or a nominal maximum output power of an inverter (e.g., as indicated on an inverter specification sheet). The inverter response curves 410 include a first inverter response curve 410a, a second inverter response curve 410b, and a third inverter response curve 410c. The first inverter response curve 410a indicates an inverter efficiency of an inverter at percentages of rated output power from zero to one hundred percent when the output voltage is eight hundred and fifty volts. The second inverter response curve 410b indicates the inverter efficiency of the inverter at percentages of rated output power from zero to one hundred percent when the output voltage is one hundred and twenty-three volts. The third inverter response curve 410c indicates the inverter efficiency of the inverter at percentages of rated output power from zero to one hundred percent when the output voltage is about fifteen hundred volts. Each of the inverter response curves includes different measured inverter efficiencies at multiple voltages, where inverter efficiency at other percentages of rated output power can be predicted by interpolating between the measured inverter efficiencies. In this way, the inverter response curves can be generated based on the measured inverter efficiencies to provide inverter output predictions at arbitrary percentages of rated output power.

As illustrated, the inverter response curves 410 indicate different inverter efficiencies at the same percentages of rated output power. For example, the first inverter response curve 410a, corresponding to an output power of eight hundred and fifty volts, indicates an efficiency of about 0.99 at twenty percent of rated output power, while the third inverter response curve 410c, corresponding to an output power of about fifteen hundred volts, indicates an efficiency of about 0.98 at twenty percent of rated output power. In generating an output prediction, either the first inverter response curve 410a, the second inverter response curve 410b, or the third inverter response curve 410c is selected, based on the output power, to determine the inverter efficiency of PV system inverters based on a predicted inverter efficiency. As shown in FIG. 4, differences between the inverter efficiency at the same voltage indicated by the inverter response curves 410 can differ in meaningful amounts, reflecting an increased accuracy of the output prediction when selecting a response curve from the inverter response curves 410.

While the inverter response curves 410 are illustrated as including three response curves for different voltages of output power, the inverter response curves 410 can include any number of response curves for different voltages of output power. In some implementations, additional response curves can be generated by interpolating between the inverter response curves 410 that are generated based on measured values. In some implementations, weights are applied to values generated using two response curves of the inverter response curves 410 based on proximity to the two response curves. In an example, a first weight of 50% is applied to an inverter efficiency value generated using the first inverter response curve 410*a* and a second weight of 50% is applied to an inverter efficiency value generated using the second inverter response curve 410*b* based on the output power being nine hundred and eighty six point five, or halfway between the voltages of output power associated with the first inverter response curve 410*a* and the second inverter response curve 410*b*.

The sets of inverter response curves 210, 310, and 410, or the predicted inverter outputs, can be combined to determine overall inverter outputs. In an example, the capacity deratings indicated by the inverter response curves 210, 310 can be combined to determine an overall capacity derating. The inverter response curves 410 can be applied to output powers below the limits defined by the capacity deratings to determine inverter output. In an example, the inverter response curves 210 are used to determine that an inverter at fifty degrees Celsius has a capacity derating of about 50% at thirteen hundred volts, the inverter response curves 310 are used to determine that the inverter has a capacity derating of about 10% at fifty degrees Celsius and one thousand feet elevation, and the inverter response curves 410 are used to determine that the inverter has an efficiency of about one at the resulting output voltage. Furthermore, additional inverter response curves, or additional sets of inverter response curves can be utilized to refine the output prediction. By selecting an inverter response curve from each set of inverter response curves, different effects on inverter output represented in the sets of inverter response curves can be combined to accurately predict inverter output.

Figure 5:
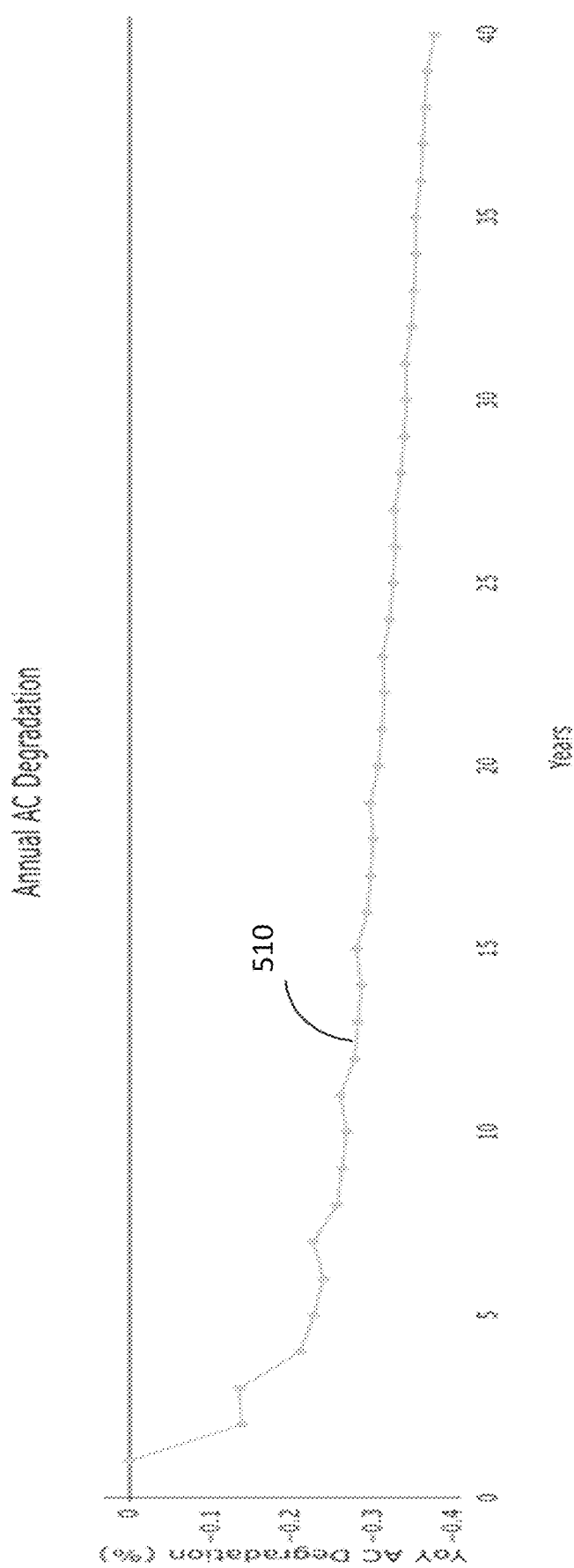
FIG. 5 illustrates an example AC output degradation curve for a PV system.

FIG. 5 illustrates an example output degradation curve 510 for a PV system. The output degradation curve 510 may show degradation of AC output energy of the PV system for each year over forty years. The degradation of AC output may represent a percentage decrease in annual AC output energy of the PV system relative to an immediate prior year. Thus, the AC output of the PV system in the first year of operation of the PV system serves as a benchmark to which the AC output of the PV system in the second year of operation of the PV system is compared to determine the AC degradation in year two. The annual AC degradation is cumulative, such that the AC output of the PV system in year forty reflects the AC degradation incurred in each prior year.

The output degradation curve 510 may be a predicted degradation curve for the PV system. The output degradation curve 510 may be used in predicting performance of the PV system over a lifetime of the PV system and/or in designing the PV system to meet one or more performance thresholds over the lifetime of the PV system. As discussed herein, inaccuracies in PV output predictions can result in increased component degradation due to sub-optimal control of PV system components (e.g., rapid discharge of energy storage device, high ramp rates, curtailment of power). Increased component degradation relative to what is expected can cause errors in the output degradation curve to be compounded year over year, causing gross inaccuracies in output predictions for the PV system in later years of its lifetime. As discussed herein, the embodiments and examples discussed herein provide for increased accuracy of output predictions, providing for accurate output predictions over the lifetime of the PV system.

The output degradation curve 510 may aid in designing the PV system. The inverter response curves discussed herein accurately capture low-voltage derating of inverters. As PV modules degrade over time, they output lower voltage, potentially causing low-voltage derating of inverters. The output degradation curve 510 can indicate whether long-term degradation of the PV modules will result in low-voltage derating of inverter curves, as reflected in degradation on the output degradation curve 510. In an example, FIG. 2 illustrates that voltages below eight hundred and fifty volts cause near-total derating of inverter output. In this way, the inverter response curves cause low-voltage inverter derating to be reflected in the output degradation curve 510, allowing for identification of long-term output degradation. In this way, the PV system can be designed to avoid loss of output power due to long-term PV module degradation. If the PV system, as modeled, has a decline in the output degradation curve 510 due to low-voltage inverter derating, the PV system can be adjusted to provide greater voltages to the inverters in later years of the PV system lifecycle to avoid low-voltage derating.

Figure 6:
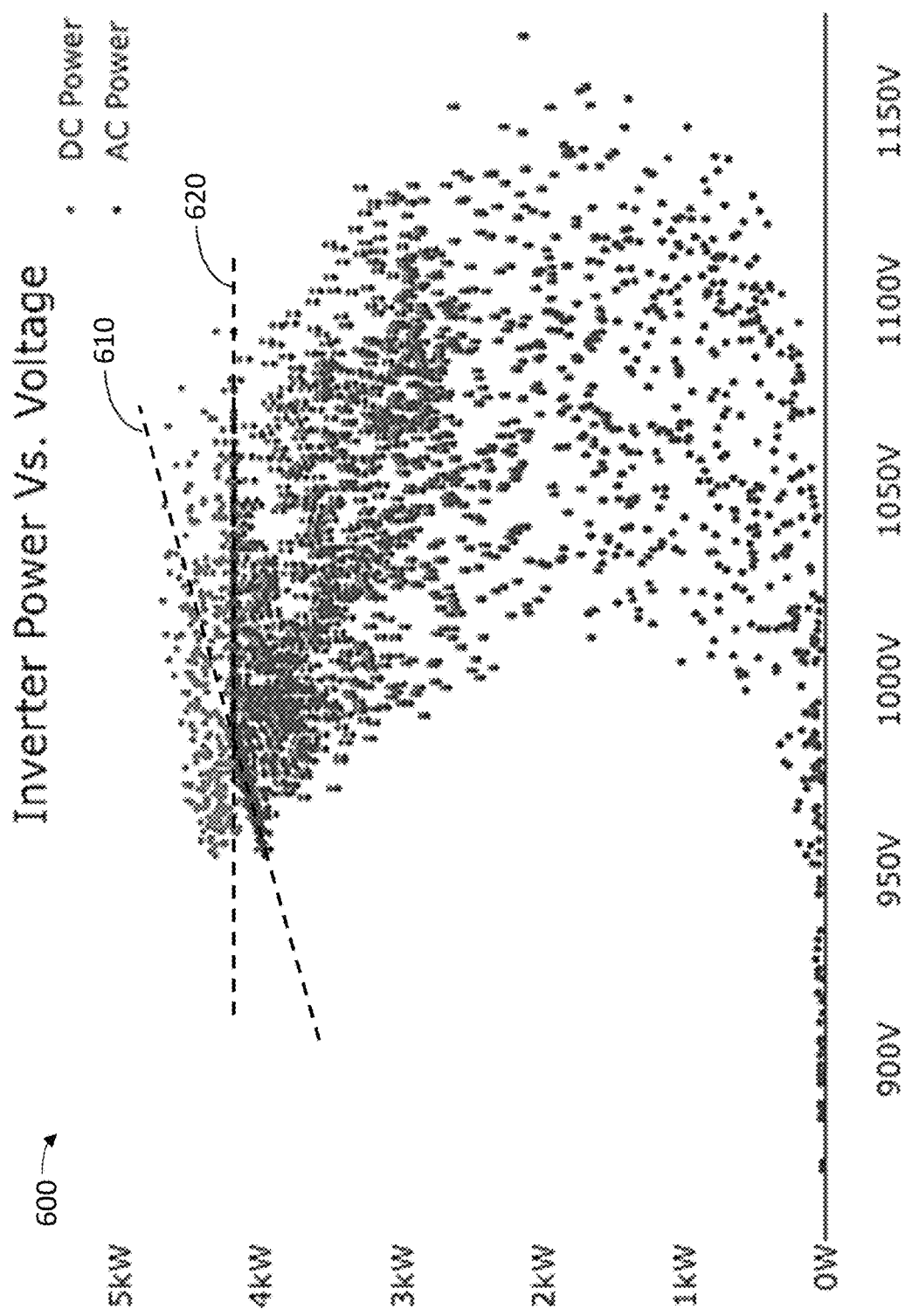
FIG. 6 is an example scatterplot showing average inverter power versus voltage for a PV system for each hour in a year.

FIG. 6 is an example scatterplot 600 showing average inverter power versus voltage for a PV system for each hour in a year. Each light gray dot represents average DC power provided to the inverter (or group of inverters) and an average voltage of the DC power in an hour in the year. Each dark gray dot represents average AC power output by the inverter (or group of inverters) and an average voltage of the AC power in a day in the year. As shown in the scatterplot 600, several light gray dots and dark gray dots are paired, with AC power output being just below DC power output, representing a slight loss in power due to non-ideal efficiency of the inverter. The AC power output can represent an output prediction for a day, as discussed herein.

The scatterplot 600 includes a first inverter power limit 610 and a second inverter power limit 620. The first inverter power limit 610 and the second inverter power limit 620 may reflect the inverter voltage derating illustrated in FIG. 2. The first inverter power limit 610 may represent a power limit for the inverter at specific voltages, such as between nine hundred and fifty volts and one thousand volts. The second inverter power limit 620 may represent a maximum power output of the inverter. As shown in the scatterplot 600, DC power outputs (as represented by the light gray dots) can be above the first inverter power limit 610 and the second inverter power limit 620, but AC power outputs (as represented by the dark gray dots cannot be above the first inverter power limit 610 and the second power inverter limit 620, representing clipping losses between PV output and inverter output. By showing excess DC power that is not converted into AC power by the inverter, the scatterplot 600 can provide information as to predicted AC output of the PV system and clipping losses between PV output and inverter output.

Figure 7:
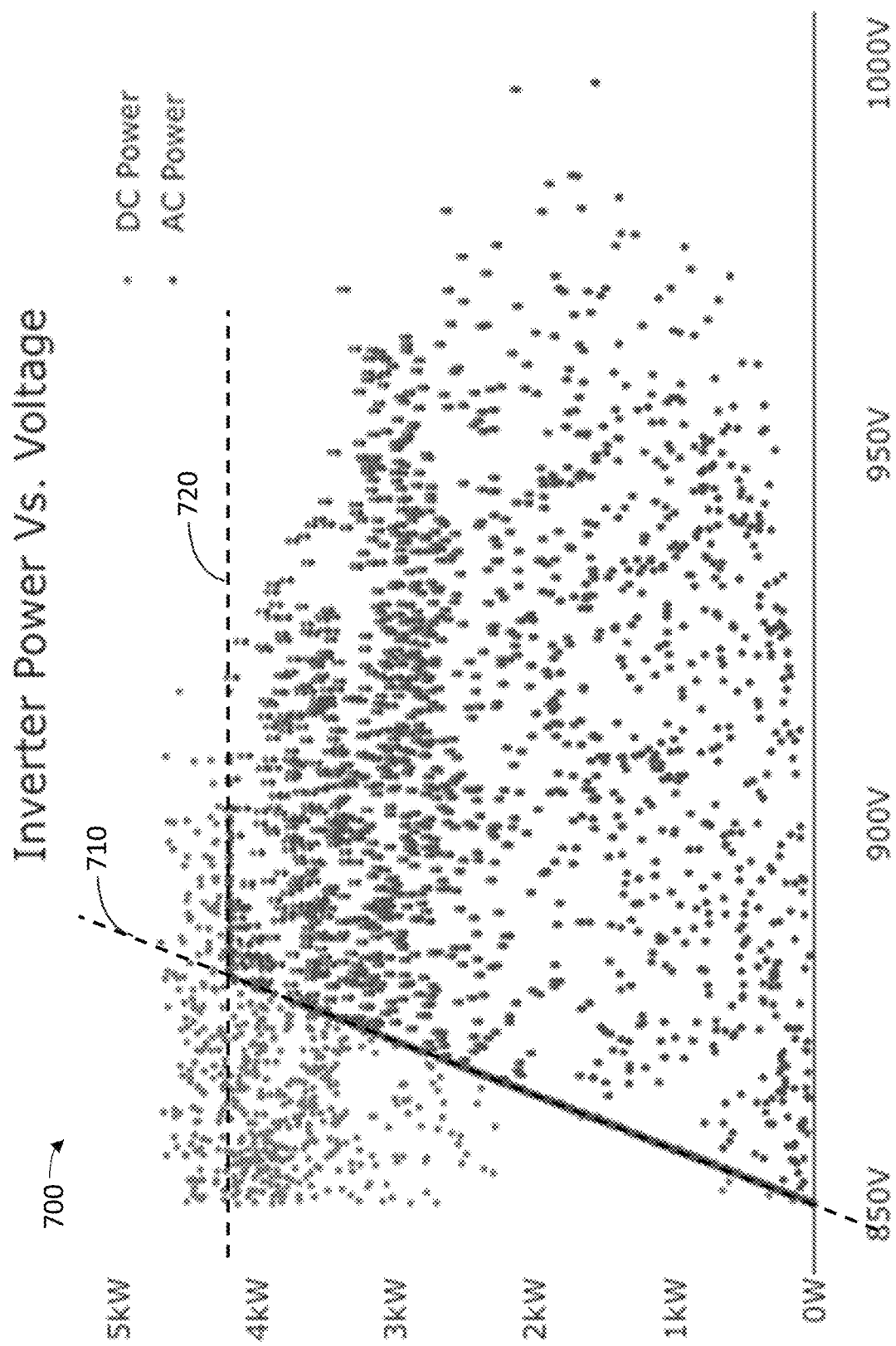
FIG. 7 is an example scatterplot showing average inverter power versus voltage for a PV system for each hour in a year.

FIG. 7 is an example scatterplot 700 showing average inverter power versus voltage for a PV system for each hour in a year. The scatterplot 700 may be similar to the scatterplot 600 of FIG. 6, but for a different PV system. In an example, the PV system for FIG. 6 has longer PV strings than the PV system for FIG. 7, where longer PV strings results in higher DC voltage. Each light gray dot represents average DC power provided to the inverter (or group of inverters) and an average voltage of the DC power in an hour in the year. Each dark gray dot represents average AC power output by the inverter (or group of inverters) and an average voltage of the AC power in a day in the year. As shown in the scatterplot 700, several light gray dots and dark gray dots are paired, with AC power output being just below DC power output, representing a slight loss in power due to non-ideal efficiency of the inverter. The AC power output can represent an output prediction for a day, as discussed herein.

The scatterplot 700 includes a first inverter power limit 710 and a second inverter power limit 720. The first inverter power limit 710 and the second inverter power limit 720 may reflect the inverter voltage derating illustrated in FIG. 2. The first inverter power limit 710 may represent a power limit for the inverter at specific voltages, such as between eight hundred and fifty volts and eight hundred and eighty volts. The second inverter power limit 720 may represent a maximum power output of the inverter. As shown in the scatterplot 700, DC power outputs (as represented by the light gray dots) can be above the first inverter power limit 710 and the second inverter power limit 720, but AC power outputs (as represented by the dark gray dots cannot be above the first inverter power limit 710 and the second power inverter limit 720, representing clipping losses between PV output and inverter output. By showing excess DC power that is not converted into AC power by the inverter, the scatterplot 700 can provide information as to predicted AC output of the PV system and clipping losses between PV output and inverter output.

By comparing the scatterplots 510, 600 and 700, a user can design a PV system to avoid clipping losses. In an example, a user can determine that a PV string length resulting in the scatterplot 700 is too short, leading to excessive clipping losses, and that a PV string length resulting in the scatterplot 600 is an improvement, resulting in lower clipping losses.

Figure 8:
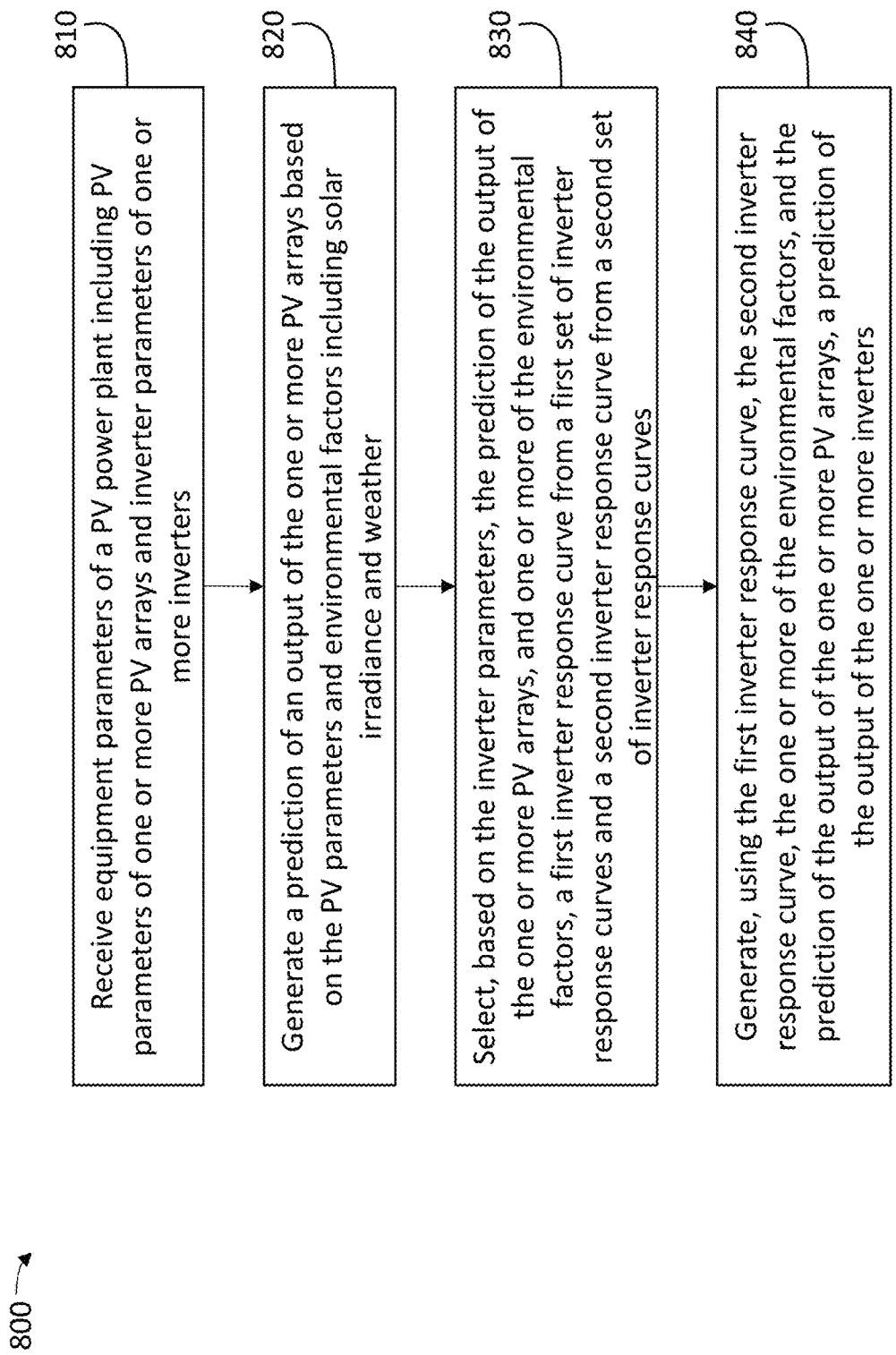
FIG. 8 is a flow diagram illustrating operations of a method for generating output predictions for PV systems.

FIG. 8 is a flow diagram illustrating operations of a method 800 for generating output predictions for PV systems. The method 800 may include more, fewer, or different operations than shown. The operations may be performed in the order shown, in a different order, or concurrently.

At operation 810, equipment parameters of a PV power plant are received, including PV parameters of one or more PV arrays and inverter parameters of one or more inverters. As discussed herein, the PV parameters can include parameters such as PV array model number, number of PV arrays, string length, nominal efficiency, maximum DC power, power limits at different temperatures, and other parameters. As discussed herein, the inverter parameters can include inverter model number, manufacturer, power factor, nominal AC power, maximum AC power, power limits at different temperatures, and other parameters. In some implementations, the inverter parameters include derate factors at various temperatures and voltages as well as derate factors at various temperatures and elevations. The equipment parameters can include energy storage device parameters such as number of storage devices, capacity, charge/discharge rate, degradation information, and other parameters.

At operation 820, a prediction of an output of the one or more PV arrays is generated based on the PV parameters and environmental factors including solar irradiance and weather. In some implementations, the environmental factors include an ambient temperature. The ambient temperature may affect an output of the one or more PV arrays and an output of the one or more inverters. In some implementations, the weather included in the environmental factors includes wind speed, humidity, precipitation, and/or cloud cover, where the cloud cover affects an amount of solar irradiance on the one or more PV arrays. In an example, an amount of solar irradiance on the one or more PV arrays and the ambient temperature are used to generate the prediction of the DC output of the one or more PV arrays.

At operation 830, a first inverter response curve from a first set of inverter response curves and a second inverter response curve from a second set of inverter response curves are selected based on the inverter parameters, and one or more of the environmental factors. The first inverter response curve may indicate a response of the one or more inverters to an input voltage given the one or more environmental factors.

In some implementations, the first set of inverter response curves indicate inverter capacity derating versus voltage. In some implementations, selecting the first response curve from the first set of inverter response curves is based on a temperature associated with the one or more inverters. The ambient temperature associated with the one or more inverters can be calculated based on the environmental data such as solar irradiance or measured directly using a thermometer. The first set of inverter response curves can include multiple inverter response curves each corresponding to a temperature of the one or more inverters. An example of the first set of inverter response curves can be the inverter response curves 210 of FIG. 2.

In some implementations, the second set of inverter response curves indicate inverter capacity derating versus temperature. In some implementations, selecting the second response curve from the second set of inverter response curves is based on an elevation of the one or more inverters. The second set of inverter response curves can include multiple inverter response curves each corresponding to an elevation of the one or more inverters. An example of the second set of inverter response curves can be the inverter response curves 310 of FIG. 3.

In some implementations, the method 800 includes generating the at least one of the first and second response curves based on the inverter parameters. Generating the at least one of the first and second response curves based on the inverter parameters can include interpolating between measurements in the inverter parameters to generate inverter response curves representing a continuous range of inverter responses. The method 800 can include generating sets of inverter parameters. In an example, the method 800 includes generating, based on the inverter parameters, continuous inverter response curves for discrete temperatures and generating, based on the continuous inverter response curves, a continuous response surface for a range of temperatures.

At operation 840, a prediction of the output of the one or more inverters is generated using the first inverter response curve, the second inverter response curve, the one or more of the environmental factors, and the prediction of the output of the one or more PV arrays. The prediction of the output of the one or more PV arrays can be applied to the first inverter response curve and/or the second inverter response curve to generate the prediction of the output of the one or more inverters.

In some implementations, generating the prediction of the output of the one or more inverters is based on a third inverter response curve. In others, the method 800 includes selecting, based on the inverter parameters, the third inverter response curve from a third set of inverter response curves. The third set of inverter response curves can indicate an efficiency of the one or more inverters versus percentage of rated output power for different voltages. An example of the third set of inverter response curves can be the inverter response curves 410 of FIG. 4.

In some implementations, the prediction of the output of the one or more inverters spans a day, where the prediction of the output of the one or more inverters includes an output prediction for every fifteen minutes in the day. In some implementations, the prediction of the output of the one or more inverters is updated at regular intervals based on new data, such as new environmental factors, or new forecasts of environmental factors. In an example, the prediction of the output of the one or more inverters is updated every fifteen minutes based on updated satellite and weather data indicating environmental factors, where the satellite and weather data is updated every fifteen minutes. In some implementations, the prediction of the output of the one or more inverters spans a year. In some implementations, the prediction of the output of the one or more inverters spans an expected lifetime of the PV power plant. In an example, the prediction of the output of the one or more inverters spans forty years. The prediction of the output of the one or more inverters can span any amount of time with any level of granularity. For example, the prediction of the output of the one or more inverters can span one day, two days, a week, a month, a year, five years, ten years, or forty years. For example, the prediction of the output of the one or more inverters can include an output prediction for every fifteen minutes, every thirty minutes, every hour, every two hours, every five hours, every ten hours, or every day.

In some implementations, the prediction of the output of the one or more inverters is provided to a user interface for display. The prediction of the output of the one or more inverters can be used to control one or more parameters of the PV power plant, such as inverter parameters, PV array parameters, and/or energy storage device parameters to improve an efficiency of the PV power plant or to reduce a degradation of the components of the PV power plant.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a model stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the monitoring device 102) to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:
   receiving equipment parameters of the PV power plant including PV parameters of one or more PV arrays and inverter parameters of one or more inverters; and
   generating a prediction of the output of the PV power plant by:
      generating a prediction of an output of the one or more PV arrays based on the PV parameters and environmental factors including solar irradiance and weather;
      selecting, based on the inverter parameters and one or more of the environmental factors, a first inverter response curve from a first set of inverter response curves indicating inverter capacity derating versus voltage and a second inverter response curve from a second set of inverter response curves;
      generating, using the first inverter response curve, the second inverter response curve, the one or more of the environmental factors, and the prediction of the output of the one or more PV arrays, a prediction of the output of the one or more inverters; and
      automatically controlling one or more operational parameters of the PV power plant based on the generated prediction of the output of the PV power plant.

2. The method of claim 1, wherein the one or more of the environmental factors include temperature.

3. The method of claim 1, wherein the second set of inverter response curves indicate inverter capacity derating versus temperature.

4. The method of claim 1, wherein selecting the second response curve from the second set of inverter response curves is based on an elevation of the one or more inverters.

5. The method of claim 1, wherein generating the prediction of the output of the one or more inverters is based on a third inverter response curve.

6. The method of claim 5, further comprising selecting, based on the inverter parameters, the third inverter response curve from a third set of inverter response curves.

7. The method of claim 6, wherein the third set of inverter response curves indicate inverter efficiency versus output power.

8. The method of claim 1, further comprising generating at least one of the first and second response curves based on the inverter parameters.

9. The method of claim 1, wherein the prediction of the output of the one or more inverters spans an expected lifetime of the PV power plant.

10. A non-transitory, computer-readable medium including instructions which, when executed by one or more processors, cause the one or more processors to:
    receive equipment parameters of the PV power plant including PV parameters of one or more PV arrays and inverter parameters of one or more inverters; and
    generate a prediction of the output of the PV power plant by:
       generating a prediction of an output of the one or more PV arrays based on the PV parameters and environmental factors including solar irradiance and weather;
       selecting based on the inverter parameters and one or more of the environmental factors, a first inverter response curve from a first set of inverter response curves indicating inverter capacity derating versus voltage and a second inverter response curve from a second set of inverter response curves;
       generating, using the first inverter response curve, the second inverter response curve, the one or more of the environmental factors, and the prediction of the output of the one or more PV arrays, a prediction of the output of the one or more inverters; and
       automatically control one or more operational parameters of the PV power plant based on the generated prediction of the output of the PV power plant.

11. The non-transitory, computer-readable medium of claim 10, wherein the one or more of the environmental factors include temperature.

12. The non-transitory, computer-readable medium of claim 10, wherein the second set of inverter response curves indicate inverter capacity derating versus temperature.

13. The non-transitory, computer-readable medium of claim 10, wherein the instructions cause the one or more processors to select the second response curve from the second set of inverter response curves based on an elevation of the one or more inverters.

14. The non-transitory, computer-readable medium of claim 10, wherein the instructions cause the one or more processors to generate the prediction of the output of the one or more inverters based on a third inverter response curve.

15. The non-transitory, computer-readable medium of claim 14, wherein the instructions cause the one or more processors to select, based on the inverter parameters, the third inverter response curve from a third set of inverter response curves.

16. The non-transitory, computer-readable medium of claim 15, wherein the third set of inverter response curves indicate inverter efficiency versus output power.

17. The non-transitory, computer-readable medium of claim 10, wherein the instructions cause the one or more processors to generate at least one of the first and second response curves based on the inverter parameters.

18. The non-transitory, computer-readable medium of claim 10, wherein the prediction of the output of the one or more inverters spans an expected lifetime of the PV power plant.

* * * * *